United States Patent
Liu et al.

(10) Patent No.: US 9,218,087 B2
(45) Date of Patent: Dec. 22, 2015

(54) SELF-CAPACITIVE TOUCH PANEL

(71) Applicant: MStar Semiconductor, Inc., Hsinchu Hsien (TW)

(72) Inventors: Chun-Chen Liu, Hsinchu County (TW); Meng-Che Tsai, Hsinchu County (TW)

(73) Assignee: MSTAR SEMICONDUCTOR, INC., Hsinchu Hsien ( * ) Notice: Subject to any disclaimer, the term of this patent is extended or adjusted under 35 U.S.C. 154(b) by 386 days.

(21) Appl. No.: 13/968,527

(22) Filed: Aug. 16, 2013

(65) Prior Publication Data

US 2014/0049121 A1 Feb. 20, 2014

(30) Foreign Application Priority Data

Aug. 17, 2012 (TW) .............................. 101129991 A

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01); *G06F 3/0418* (2013.01)

(58) Field of Classification Search
CPC ...... G06F 3/0416; G06F 3/0418; G06F 3/044
USPC ........................................................... 307/650
See application file for complete search history.

(56) References Cited

U.S. PATENT DOCUMENTS

| | | | | |
|---|---|---|---|---|
| 7,973,771 B2* | 7/2011 | Geaghan | ................. | G06F 3/044 345/173 |
| 2007/0257894 A1* | 11/2007 | Philipp | .................. | G06F 3/044 345/173 |
| 2009/0256821 A1* | 10/2009 | Mamba | .................. | G06F 3/044 345/174 |

* cited by examiner

*Primary Examiner* — Hal Kaplan
(74) *Attorney, Agent, or Firm* — WPAT, PC; Justin King

(57) ABSTRACT

A self-capacitive touch panel including a border electrode and a central electrode is provided. The border electrode has a first centroid. The central electrode has a second centroid A first average distance from the first centroid to all possible touch points in the border electrode is smaller than a second average distance from the second centroid to all possible touch points in the central electrode.

9 Claims, 8 Drawing Sheets

SELF-CAPACITIVE TOUCH PANEL

This application claims the benefit of Taiwan application Serial No. 101129991, filed Aug. 17, 2012, the subject matter of which is incorporated herein by reference.

BACKGROUND OF THE INVENTION

1. Field of the Invention

The invention relates in general to touch system, and more particularly, to a technique for enhancing the accuracy of sensing results for a border region of a touch panel.

2. Description of the Related Art

Operating interfaces of recent electronic products have become more and more user-friendly and intuitive as technology advances. For example, via a touch screen, a user can directly operate programs as well as input messages/texts/patterns with fingers or a stylus; in this way, it is much easier to convey demands than operating via traditional input devices such as a keyboard or buttons. In practice, a touch screen usually comprises a touch sensing panel and a display device disposed at the back of the touch sensing panel. According to a position of a touch on the touch sensing panel and a currently displayed image on the display device, an electronic device determines an intention of the touch to execute corresponding operations.

Current capacitive touch control techniques are in general categorized into self-capacitive and mutual-capacitive types. Self-capacitive touch panel, featuring a single electrode structure of a simpler fabrication process and low costs, prevails in entry-level electronic devices.

FIG. 1 shows an example of a self-capacitive touch panel. In a sensing region 100 demarcated by dotted lines, multiple electrodes (e.g., electrodes 11, 12, 14, 15 and 17) having equal widths and each appearing similar to a right-angle triangle are disposed. Due to costly sensors for detecting capacitance changes in the electrodes, current touch panels are frequently designed to have multiple electrodes share one sensor. As shown in FIG. 1, the electrodes 11 and 12 are coupled to a first upper sensor 13, and the electrodes 14 and 15 are coupled to a first lower sensor 16. In other words, rather than a capacitance change respectively corresponding to the electrodes 11 and 12, the capacitance change detected by the first upper sensor 13 is a sum of capacitance changes occurring at the electrodes 11 and 12. In FIG. 1, the capacitance changes detected by a 2*N number of sensors (an N number of upper sensors and an N number of lower sensors, each of which has a denotation and serves as an $i^{th}$ sensor, where i=1 to 2N) are transmitted to a controller (not shown) for the controller to determine an occurring user touch. The controller may calculate an x-coordinate along an X direction according to the equation below:

$$x = \frac{\sum_{i=1}^{2N}(C_i^* X_i)}{\sum_{i=1}^{2N} C_i} \quad (1)$$

In the above equation, i represents an integral index between 1 and 2N, Ci represents the capacitance change detected at the $i^{th}$ sensor, and Xi represents coordinates of a common centroid of electrodes coupled to the $i^{th}$ sensor. Taking the first upper sensor 13 as an example, the coordinates of the corresponding centroid Xi is a position of the common centroid of the two electrodes 11 and 12 (between the electrodes 11 and 12).

The touch panel in FIG. 1 faces a challenge of a remarkable error between sensing results of two left and right border regions. Reasons behind such occurrence are described below with reference to FIGS. 2 and 3 again depicting the electrodes 11, 12, 14, 15 and 17 in FIG. 1.

When a user touch occurs at a position represented by a dotted circle 21 in FIG. 2, only the electrodes 11 and 14 are affected. Thus, a noticeable error is incurred from calculating the x-coordinate based on the capacitance change detected by the first upper sensor 13 and the first lower sensor 16. More specifically, although the capacitance change detected by the first upper sensor 13 mostly comes from the electrode 11, instead of a centroid of the electrode 11, the controller nevertheless regards a position (denoted as P1) of a common centroid of the electrodes 11 and 12 as the position at which the capacitance change detected by the first upper sensor 13 occurs. Similarly, although the capacitance change detected by the first lower sensor 16 mostly comes from the electrode 14, instead of a centroid of the electrode 14, the controller nonetheless regards a position (denoted as P2) of a common centroid of the electrodes 14 and 15 as the position at which the capacitance change detected by the first lower sensor 16 occurs. Consequently, the x-coordinate calculated is apparently deviated to the right of the actual position of the circle 21.

Referring to FIG. 3, assuming that the circle 21 is not located at a border position of the sensing region 100, a left half of the circle 21 theoretically triggers another electrode 31 (physically non-existent, represented by dotted lines), thus providing a capacitance change that deviates the x-coordinate to the left (closer to real X-coordinate of the circle 21 than the x-coordinate). In other words, in a border region, due to the lack of a balancing value possibly contributed by the virtual electrode 31 as well as great distances from the centroids P1 and P2 to the real X-coordinate, the x-coordinate calculated by the controller may contain a remarkable error.

The above detection error at a border region much likely causes a misjudgment on an intention of a user touch to lead an incorrect operation result. Yet, discarding the left and right borders as a sacrifice for preventing the above issue, hardware costs are wasted.

SUMMARY OF THE INVENTION

The invention is directed to a self-capacitive touch panel for generating a detection result having an enhanced accuracy through changing a centroid position corresponding to a sensor of a border region.

According to an aspect of the present invention, a self-capacitive touch panel including a border electrode and a central electrode is provided. The border electrode has a first centroid. The central electrode has a second centroid. A first average distance from the first centroid to all possible touch points in the border electrode is smaller than a second average distance from the second centroid to all possible touch points in the central electrode.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 4:
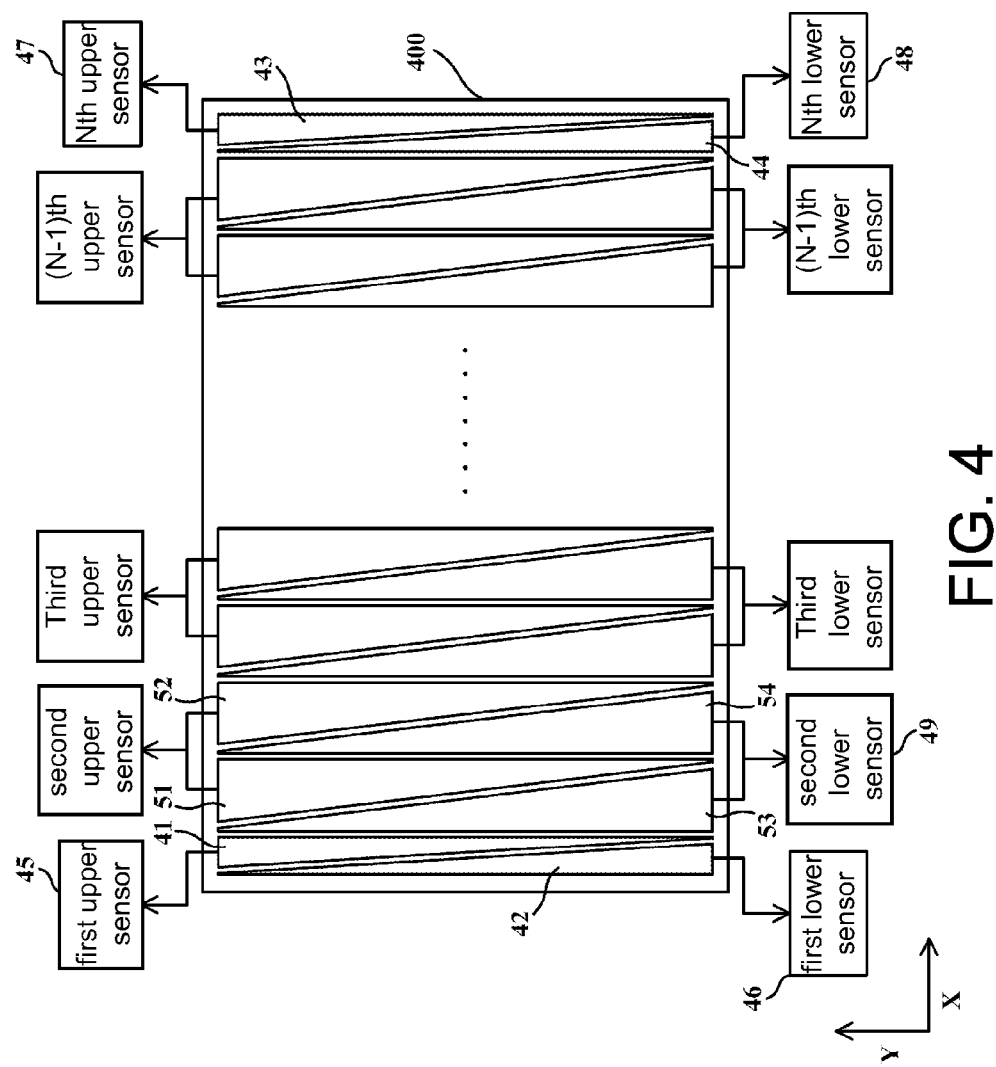
FIG. 4 is an exemplary electrode/sensor arrangement according to an embodiment of the present invention.

FIG. 4 shows a block diagram of a self-capacitive touch panel according to an embodiment of the present invention. In a sensing region 400 demarcated by a dotted line, multiple electrodes each appearing similar to a right-angle triangle are disposed. As shown in FIG. 4, in the sensing region 400, leftmost border electrodes 41 and 42 and rightmost border electrodes 43 and 44 are narrower than other electrodes (e.g., electrodes 51, 52, 53 and 54) located at a central region. In other words, different from the prior art in FIG. 1, not all of the electrodes in the embodiment have equal widths. The border electrodes 41, 42, 43 and 44 appear as a first right-angle triangle, whereas other electrodes appear as a second right-angle triangle. A shortest side (parallel to the X-direction in the diagram) of the first right-angle triangle is shorter than a shortest side of the second right-angle triangle; a second shortest side (parallel to the Y-direction in the diagram) of the first right-angle triangle is equal to a second shortest side of the second right-angle triangle.

As shown in FIG. 4, a first upper sensor 45 is dedicated for detecting a capacitance change of the border electrode 41, a first lower sensor 46 is dedicated for detecting a capacitance change of the border electrode 42, an $N^{th}$ upper sensor 47 is dedicated for detecting a capacitance change of the border electrode 43, and an $N^{th}$ lower sensor 48 is dedicated for detecting a capacitance change of the border electrode 44. In the central region, every two of the electrodes share one sensor. In practice, the self-capacitive touch panel may further include a controller (not shown) for detecting a touch position according to detection results of the sensors.

Details for obtaining an enhanced accuracy for detection results of a border region according to an embodiment are described with reference to FIG. 5 again depicting the electrodes 41, 42, 51, 52, 53. For comparison, it is assumed that the widths of the electrode 51 and the electrode 11 in FIG. 1 with respect to the X-direction are substantially equal, but the present invention is not limited hereto.

Figure 5:
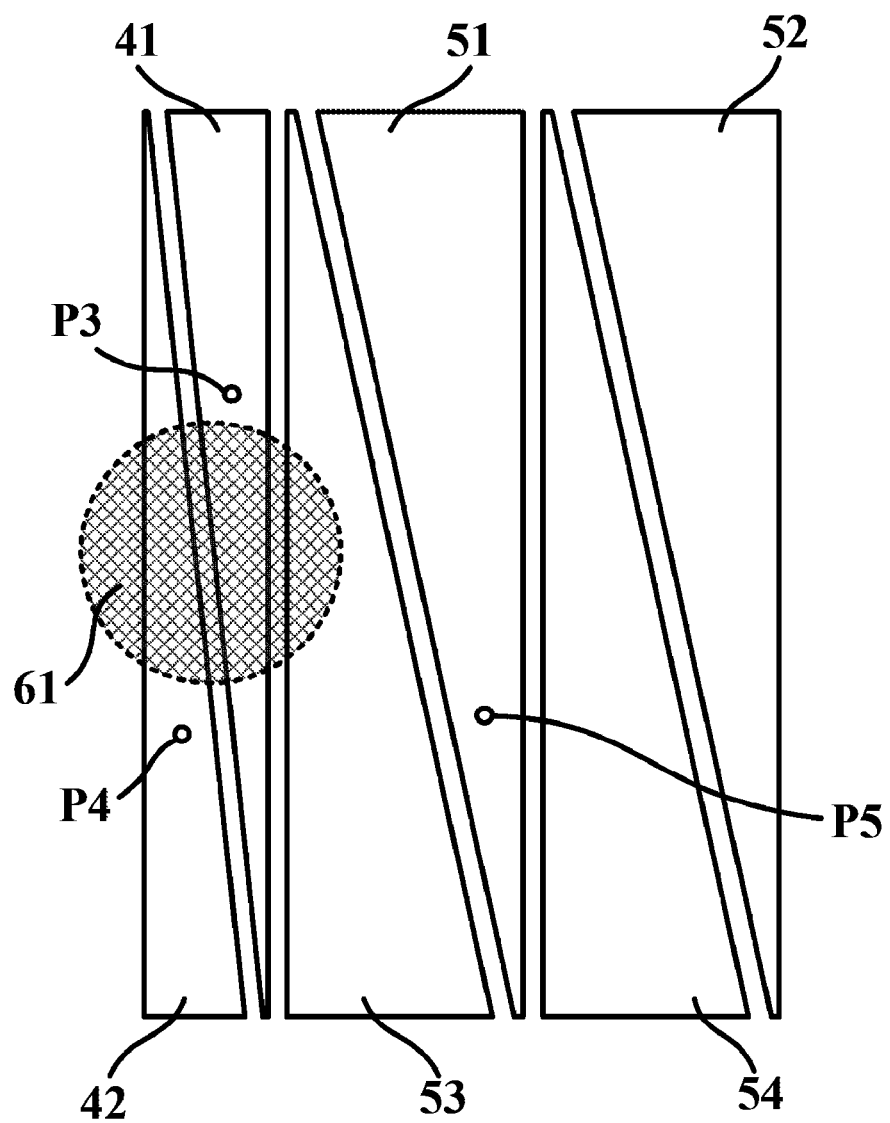
FIG. 5 illustrates reasons for an enhanced positioning accuracy according to the embodiment.

When a user touch occurs at a position indicated by a dotted circle 61 in FIG. 5, the electrodes 41, 42 and 53 are all affected. Thus, the capacitance changes detected by the first upper sensor 45, the first lower sensor 46 and the second lower sensor 49 are all adopted for calculating coordinates of a touch point. As the first upper sensor 45 is coupled to only the electrode 41, when determining the X-coordinate of the touch point according to equation (1), the controller employs a centroid position (denoted as P3) of the electrode 41 to represent a position at which the capacitance change detected by the first upper sensor 45 occurs. Similarly, a centroid position (denoted as P4) of the electrode 42 is utilized to represent a position at which the capacitance change detected by the first lower sensor 46 occurs. Further, a position of a common centroid (denoted as P5) of the electrodes 53 and 54 is utilized to represent a position at which the capacitance change detected by the second lower sensor 49 occurs.

As shown in FIG. 5, in the X-direction, although the centroid position P5 is located relative farther from the circle 61, the centroid positions P3 and P4 are quite close to the circle 61. It can be appreciated that, compared to the situation in FIG. 2, the x-coordinate calculated by the controller in the embodiment more approximates the actual X-coordinate of the circle 61. More specifically, the reason why the electrode/sensor arrangement in FIG. 4 provides a more accurate x-coordinate is that, in average, the centroid positions considered by the controller for calculating the x-coordinate are closer to the position of the electrode at which the capacitance change actually occurs. By comparing the electrode 41 in FIG. 5 and the electrodes 11 and 12 in FIG. 2, an average distance from the centroid P3 to all possible touch points in the electrode 41 is apparently smaller than an average distance from the centroid P1 to all possible touch points in the electrodes 11 and 12. Therefore, in average, instead of utilizing the X-coordinate of the centroid P1 to represent the capacitance change detected by the first upper sensor 13, by utilizing the X-coordinate of the centroid to represent the capacitance change detected by the first upper sensor 45, the position at which a user touch occurs can be more accurately reflected.

Figure 1:
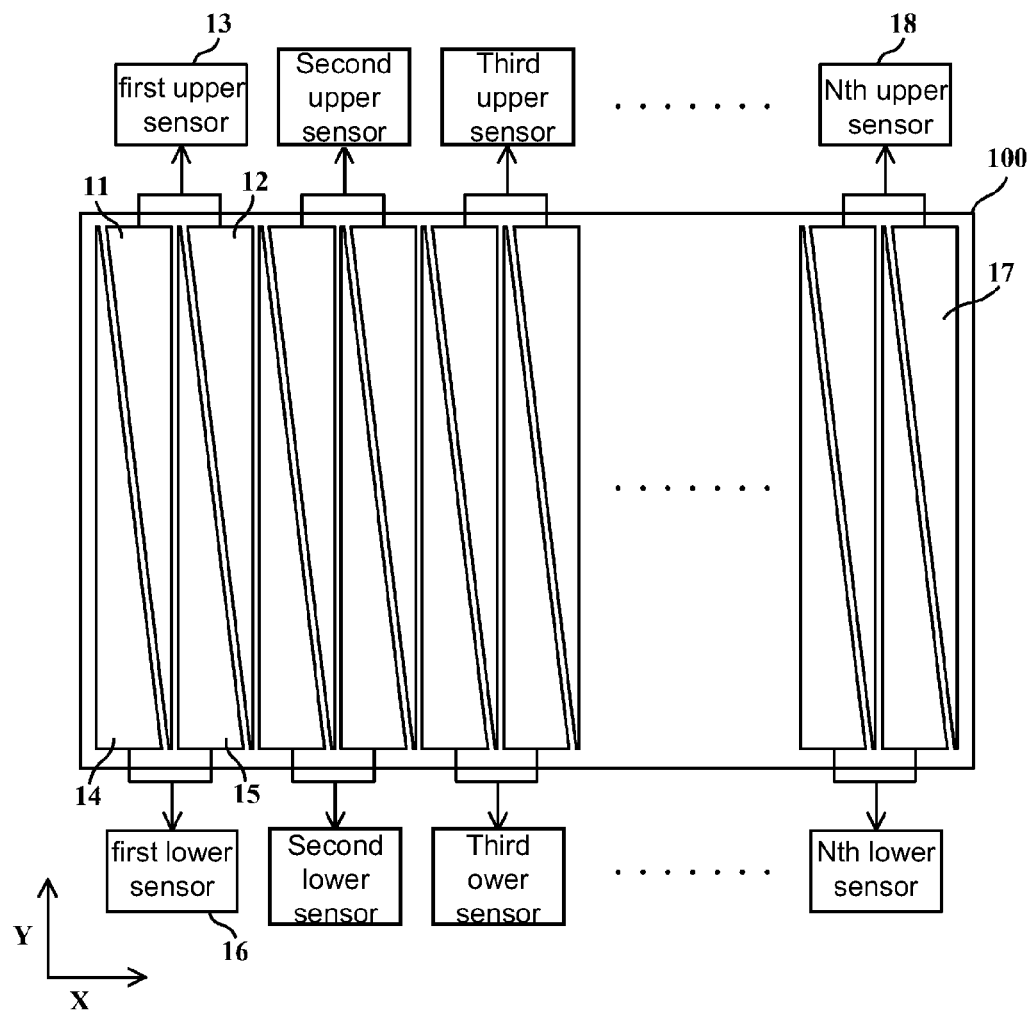
FIG. 1 is an example of a conventional self-capacitive touch panel.

It should be noted that, the total number of sensors in FIG. 4 may be designed to be the same as that of the sensors in FIG. 1. In practice, by slightly increasing the widths of the electrodes (e.g., the electrodes 51, 52, 53 and 54) in the sensing region 400 with respect to the X-direction, the size of the sensing region 400 may be kept at the same size as that of the sensing region 100. From a different perspective, by determining the size of the sensing region 400 and the total number of sensors in the sensing region 400, as well as a relative ratio between the widths of the electrodes in the central region and the border regions in advance, the width of each of the electrodes in the two regions can be calculated.

Figure 6:
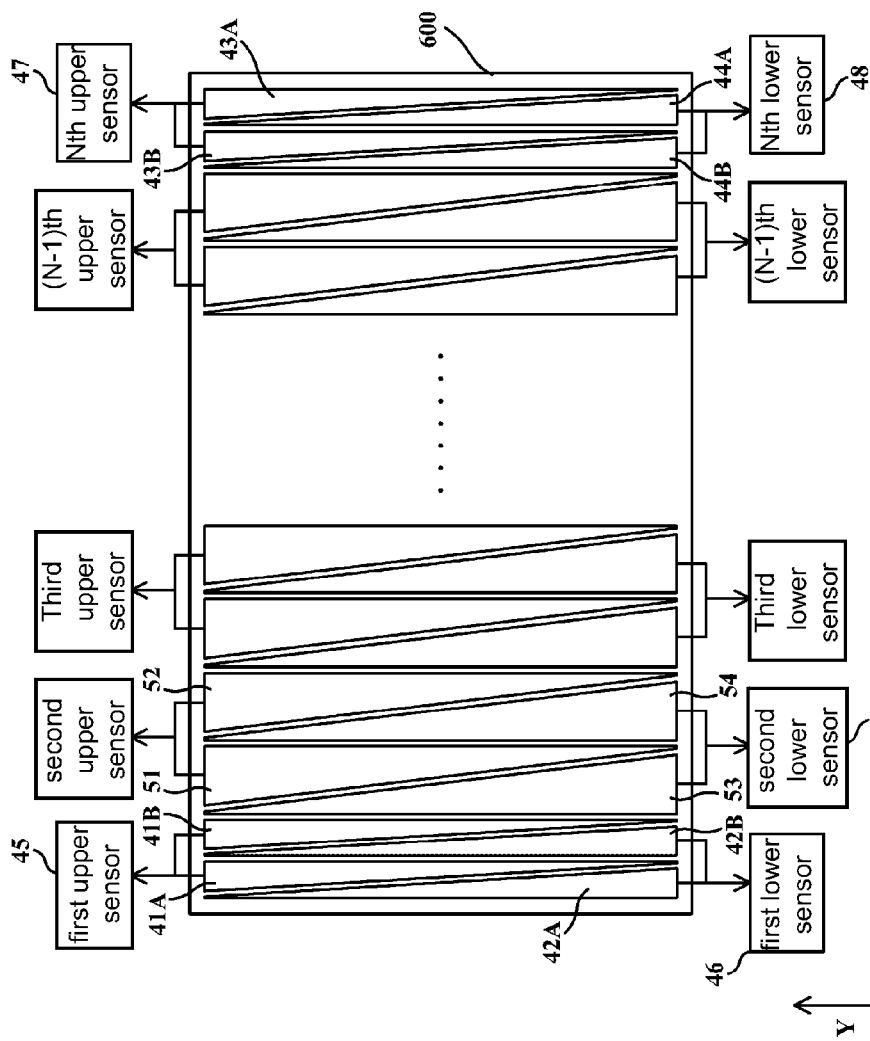
FIG. 6 is an exemplary electrode/sensor arrangement according to an embodiment of the present invention.

FIG. 6 shows a block diagram of a self-capacitive touch panel according to another embodiment of the present invention. In a sensing region 600, four leftmost electrodes 41A, 41B, 42A and 42B and four rightmost electrodes 43A, 43B, 44A and 44B are narrower than other electrodes (e.g., electrodes 51, 52, 53 and 54) at a central region. As shown in FIG. 6, in the embodiment, a first upper sensor 45 is shared by the electrodes 41A and 42B, a first lower sensor 46 is shared by the electrodes 42A and 42B, an $N^{th}$ upper sensor 47 is shared by the electrodes 43A and 43B, and an $N^{th}$ sensor 48 is shared by the electrodes 44A and 44B. For the other electrodes with a wider width in the central region, every two electrodes similarly share one sensor. In practice, the self-capacitive touch panel may also further include a controller (not shown) for determining a position of a touch point according to detection results of the sensors.

Details for obtaining an enhanced accuracy for detection results of a border region according to an embodiment are described with reference to FIG. 7 again depicting the electrodes 41A, 41B, 42A, 42B, 51, and 53. For comparison purposes, for example, it is assumed that the widths of the electrode 51 and the electrode 11 in FIG. 1 with respect to the X-direction are substantially equal.

Figure 7:
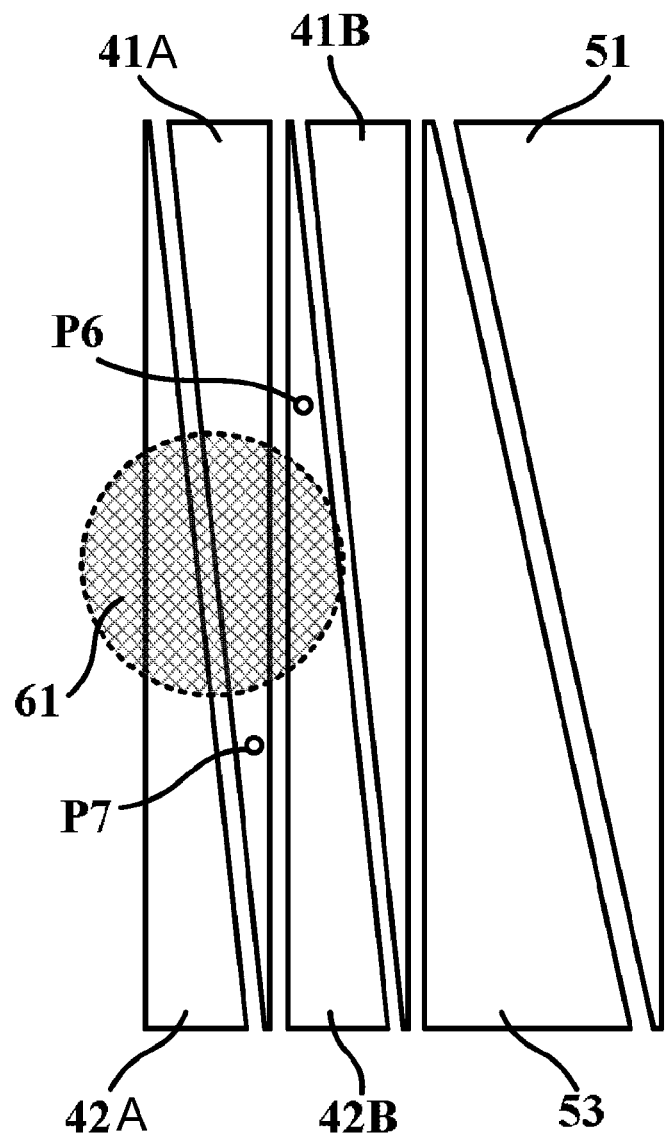
FIG. 7 illustrates reasons for an enhanced positioning accuracy according to the embodiment.

When a user touch occurs at a position indicated by a dotted circle 61 in FIG. 7, the electrodes 41A, 42A and 42B are affected. Thus, the capacitance changes detected by the first upper sensor 45 and the first lower sensor 46 are adopted for calculating coordinates of a touch point. As the first upper sensor 45 is coupled to only the electrode 41, when determining the X-coordinate of the touch point according to equation (1), the controller employs a common centroid position (denoted as P6) of the electrodes 41A and 42B to represent a position at which the capacitance change detected by the first upper sensor 45 occurs, and utilizes a common centroid position (denoted as P7) of the electrodes 42A and 42B to represent a position at which the capacitance detected by the first lower sensor 46 occurs. Compared to the X-coordinates of the centroids P1 and P2 for representing the capacitance change, the X-coordinates of the centroids P6 and P7 for representing the capacitance change in the embodiment are apparently closer to the actual X-coordinate of the circle 61. Therefore, it is concluded that, compared to the electrode/sensor arrangement in FIG. 1, the electrode/sensor arrangement in FIG. 6 provides a more accurate x-coordinate.

Figure 8:
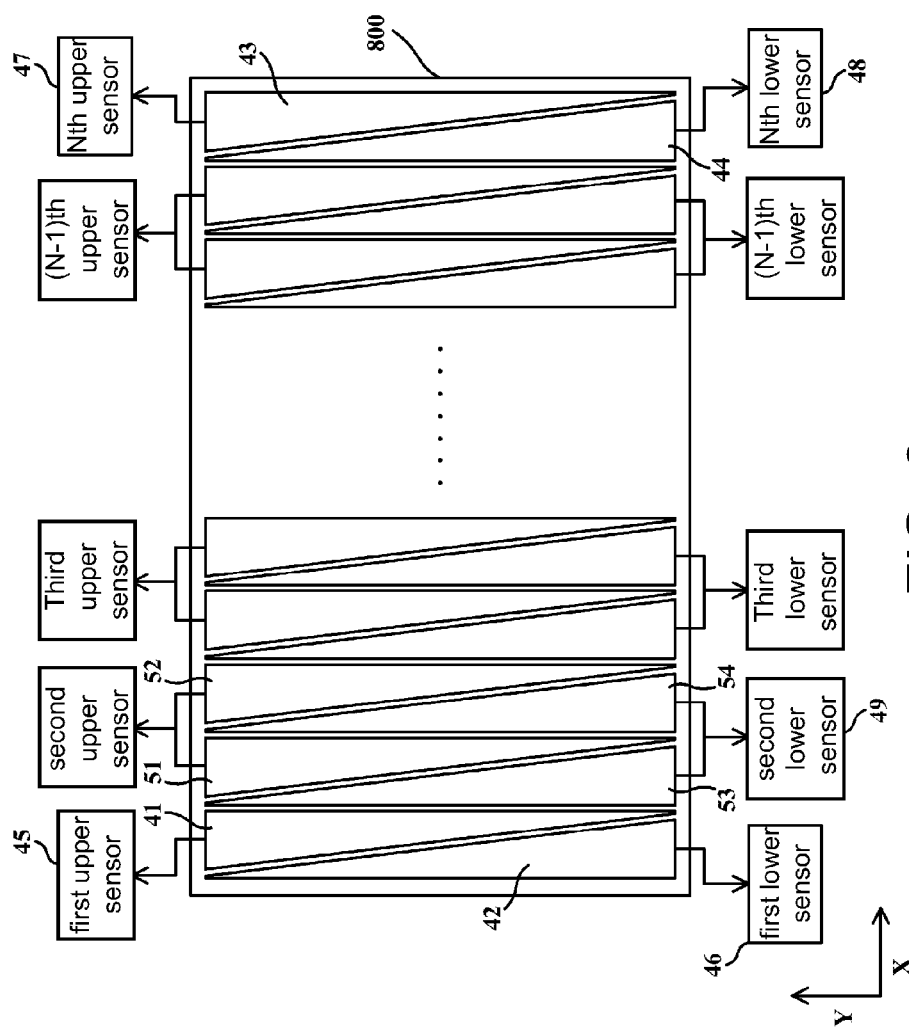
FIG. 8 is an exemplary electrode/sensor arrangement according to another embodiment of the present invention.

FIG. 8 shows a block diagram of a self-capacitive touch panel according to yet another embodiment of the present invention. In a sensing region 800, multiple electrodes each appearing similar to a right-angle triangle are disposed, and width of the electrodes at a central region and border regions equal. As shown in FIG. 8, a first upper sensor 45 is dedicated for detecting the capacitance change of a border electrode 41, a first lower sensor 46 is dedicated for detecting the capacitance change of a border electrode 42, an $N^{th}$ upper sensor 47 is dedicated for detecting the capacitance change of a border electrode 43, and an $N^{th}$ lower sensor 48 is dedicated for detecting the capacitance change of a border electrode 44. In the central region, every two of the electrodes share one sensor. In practice, the self-capacitive touch panel may further include a controller (not shown) for detecting a touch position according to detection results of the sensors.

Figure 2:
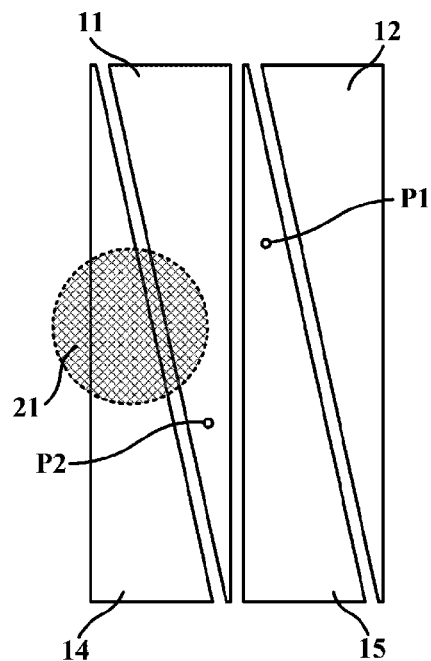
FIGS. 2 and 3 illustrate reasons of remarkable sensing errors at border regions of a conventional self-capacitive touch panel.
Figure 3:
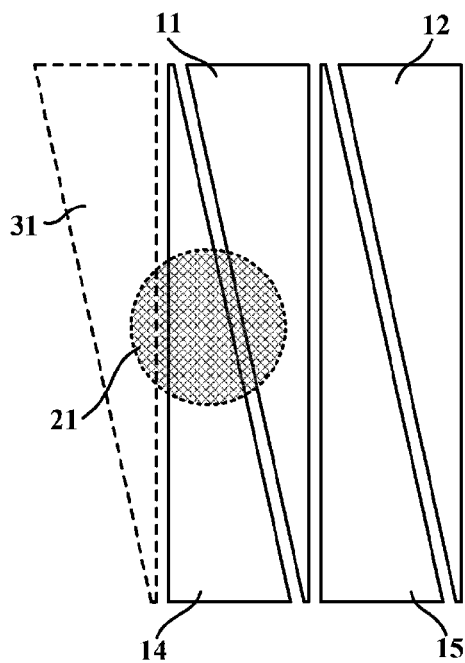

Assume that the width of the electrode 41 in FIG. 8 equals to the widths of the electrodes 11 and 12 in FIG. 2, and the electrode 41 in FIG. 8 can be compared with the electrodes 11 and 12 in FIG. 2. However, different from the electrodes 11 and 12 in the border region both coupled to the first upper sensor 13 in FIG. 2, the electrode 41 in the border region is independently coupled to the first upper sensor 45. An average distance from a centroid of the electrode 41 to all possible touch points in the electrode 41 is apparently smaller than an average distance from the centroid P1 to all possible touch points in the electrodes 11 and 12. Therefore, in average, instead of utilizing the X-coordinate of the centroid P1 to represent the capacitance change detected by the first upper sensor 13, by utilizing the X-coordinate of the centroid of the electrode 41 to represent the capacitance change detected by the first upper sensor 45, the position at which a user touch occurs can be more accurately reflected. Similarly, in average, instead of utilizing the X-coordinate of the centroid P2 to represent the capacitance change detected by the lower upper sensor 16, by utilizing the X-coordinate of the centroid of the electrode 42 to represent the capacitance change detected by the first lower sensor 46, the position at which a user touch occurs can be more accurately reflected. Therefore, it is concluded that, compared to the electrode/sensor arrangement in FIG. 1, the electrode/sensor arrangement in FIG. 8 provides a more accurate x-coordinate.

Figure 9:
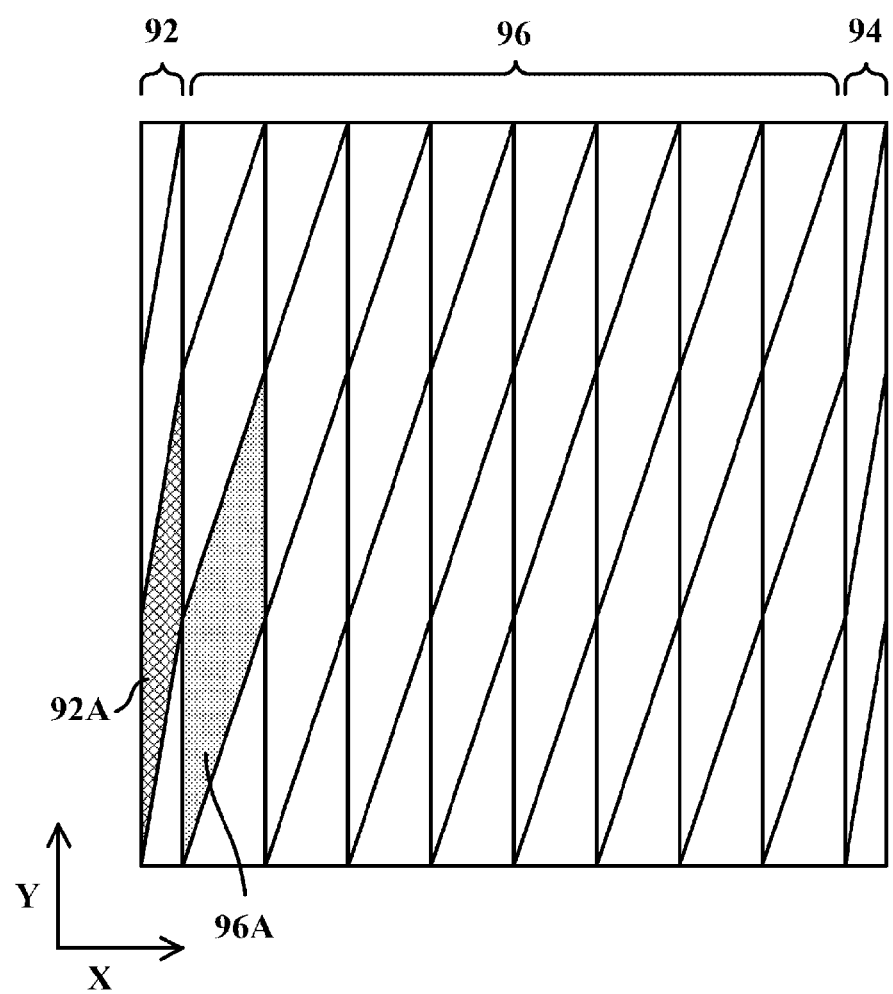
FIG. 9 is an exemplary electrode/sensor arrangement according to yet another embodiment of the present invention

FIG. 9 shows an electrode arrangement of a self-capacitive touch panel according to yet another embodiment of the present invention. In the embodiment, the shapes of electrodes include a parallelogram and a right-angle triangle. Electrodes (whether parallelogram electrodes or right-angle triangle electrodes) in border regions 92 and 94 have widths with respect to the X-direction shorter than widths of electrodes in a central region 96 with respect to the X-direction. In the embodiment, an equation for calculating the X-coordinate of a touch position is also associated with a position of a centroid of an electrode. In the situation where each of the border electrodes 92A and central electrodes 96A is independently coupled to one sensor, the border electrodes 92A having a narrower width further promote an accuracy in the x-coordinate in calculation results.

It is demonstrated with the above embodiments that, in the present invention, by changing a position of a centroid corresponding to a sensor in a border region, an x-coordinate with a preferred accuracy can be generated. For FIGS. 4 and 8, the average distance from the centroid of the border electrode 41 to all the possible touch points in the border electrode 41 is designed to be smaller than the average distance from the common centroid of the central electrodes 51 and 52 to all the possible touch points in the electrodes 51 and 52. For FIG. 6, the average distance from the common centroid of the border electrodes 41A and 42B to all the possible touch points in the electrodes 41A and 41B is also designed to be smaller than the average distance from the common centroid of the central electrodes 51 and 52 to all the possible touch points in the central electrodes 51 and 52.

It can be appreciated that the concept of the present invention is not limited to applications of the abovementioned electrode shapes, electrode arrangements and sensor arrangements. For example, the central electrodes in FIG. 4 may be designed to individually connect to one sensor (i.e., not sharing any sensors). As such, as the average distance from the centroid of the border electrode 41 to all possible touch points in the border electrode 51 is still smaller than the average distance from the centroid of the central electrode 51 to all the possible touch points in the central electrode 51, a more accurate x-coordinate can be similarly achieved.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A self-capacitive touch panel, comprising:
   a border electrode, having a first centroid representing a position at which a detected capacitance change of the border electrode occurs; and
   a central electrode, having a second centroid representing a position at which a detected capacitance change of the central electrode occurs;
   wherein, a first average distance from the first centroid to all possible touch points in the border electrode is smaller than a second average distance from the second centroid to all possible touch points in the central electrode.

2. The self-capacitive touch panel according to claim 1, the first centroid having a first coordinate, the second centroid having a second coordinate, the self-capacitive touch panel further comprising:
   a first sensor, coupled to the border electrode, for detecting a first capacitance change occurring at the border electrode;
   a second sensor, coupled to the central electrode, for detecting a second capacitance change occurring at the central electrode; and
   a controller, for determining a position of a touch point according to a product of the first coordinate and the first capacitance change and a product of the second coordinate and the second capacitance change.

3. The self-capacitive touch panel according to claim 1, wherein a planar shape of the border electrode is similar to a first right-angle triangle, the central electrode comprises a plurality of central sub-electrodes each having a planar shape similar to a second right-angle triangle, a shortest side of the first right-angle triangle is shorter than a shortest side of the second right-angle triangle, and a second shortest side of the first right-angle triangle is equal to a second shortest side of the second right-angle triangle.

4. The self-capacitive touch panel according to claim 1, wherein the central electrode comprises a plurality of central sub-electrodes each having a planar shape similar to a first right-angle triangle, the border electrode comprises a plurality of border sub-electrodes each having a planar shape similar to a second right-angle triangle, a shortest side of the first right-angle triangle is shorter than a shortest side of the second right-angle triangle, and a second shortest side of the first right-angle triangle is equal to a second shortest side of the second right-angle triangle.

5. The self-capacitive touch panel according to claim 1, wherein the central electrode comprises a plurality of central sub-electrodes, and a planar shape of the border electrode and the central sub-electrodes is similar to a right-angle triangle.

6. The self-capacitive touch panel according to claim 1, wherein a planar shape of the border electrode is similar to a first right-angle triangle, a planar shape of the central electrode is similar to a second right-angle triangle, a shortest side of the first right-angle triangle is shorter than a shortest side of the second right-angle triangle, and a second shortest side of the first right-angle triangle is equal to a second shortest side of the second right-angle triangle.

7. The self-capacitive touch panel according to claim 1, wherein a planar shape of the border electrode is similar to a first parallelogram, a planar shape of the central electrode is similar to a second parallelogram, a first side of the first parallelogram is equal to a second side of the second parallelogram, and a first height of the first parallelogram perpendicular to the first side is shorter than a second height of the second parallelogram perpendicular to the second side.

8. A self-capacitive touch panel, comprising:
 a border electrode, having a first centroid representing a position at which a detected capacitance change of the border electrode occurs, comprising a plurality of border sub-electrodes;
 a central electrode, having a second centroid representing a position at which a detected capacitance change of the central electrode occurs, comprising a plurality of central sub-electrodes;
 a first sensor, comprising a plurality of first sub-sensors, wherein each of the first sub-sensors is coupled to a first border sub-electrode of the border sub-electrodes to detect a first capacitance change occurring at the border electrode; and
 a second sensor, comprising a plurality of second sub-sensors, wherein each of the second sub-sensors is coupled to a first central sub-electrode of the central sub-electrodes to detect a second capacitance change occurring at the central electrode.

9. The self-capacitive touch panel according to claim 8, the first centroid having a first coordinate, the second centroid having a second coordinate, the self-capacitive touch panel further comprising:
 a controller, for determining a position of a touch point according to a product of the first coordinate and the first capacitance change and a product of the second coordinate and the second capacitance change.

\* \* \* \* \*